March 28, 1939. A. M. SOSA 2,151,875
METHOD OF TURNING WOOD HEELS
Filed Nov. 14, 1936    2 Sheets-Sheet 1

INVENTOR.
Augustus M. Sosa
ATTORNEYS.

March 28, 1939.　　　　A. M. SOSA　　　　2,151,875
METHOD OF TURNING WOOD HEELS
Filed Nov. 14, 1936　　2 Sheets—Sheet 2

INVENTOR.
Augustus M. Sosa
BY
ATTORNEYS.

Patented Mar. 28, 1939

2,151,875

UNITED STATES PATENT OFFICE 2,151,875

METHOD OF TURNING WOOD HEELS

Augustus M. Sosa, Portsmouth, Ohio, assignor to Vulcan Corporation, Portsmouth, Ohio Application November 14, 1936, Serial No. 110,792

13 Claims. (Cl. 12—147)

This invention relates to a method of shaping the side and back contour areas of a wood heel for shoes and has for its general object to provide a method which reduces the number and complexity of movements necessary in producing a wood heel.

A further object of the invention is to provide a method of shaping certain portions of a heel in a manner which increases the speed of production and lowers the cost thereof.

A further object of the invention is to provide a method of rapidly, accurately and smoothly shaping the contoured side and back areas of a wood heel.

Other objects and features of the invention will more fully appear from the following description in connection with the accompanying drawings and will be particularly pointed out in the claims.

Figure 1:
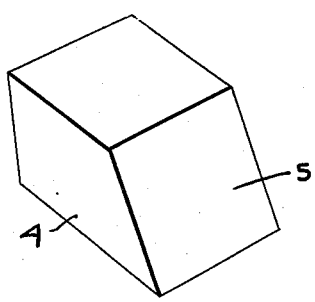
Figure 2:
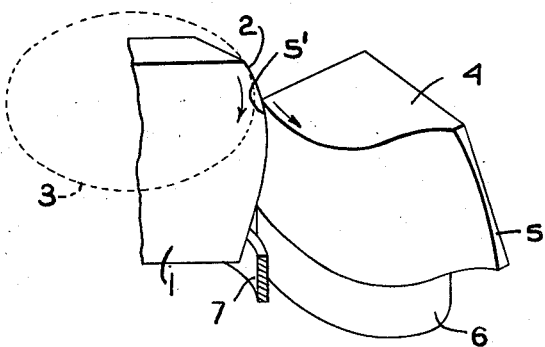
Figure 3:
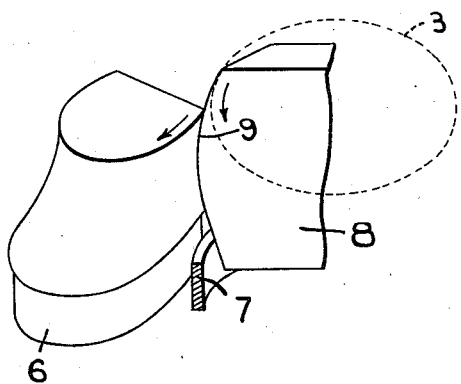
Figure 4:
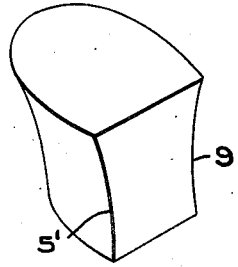
Figure 5:
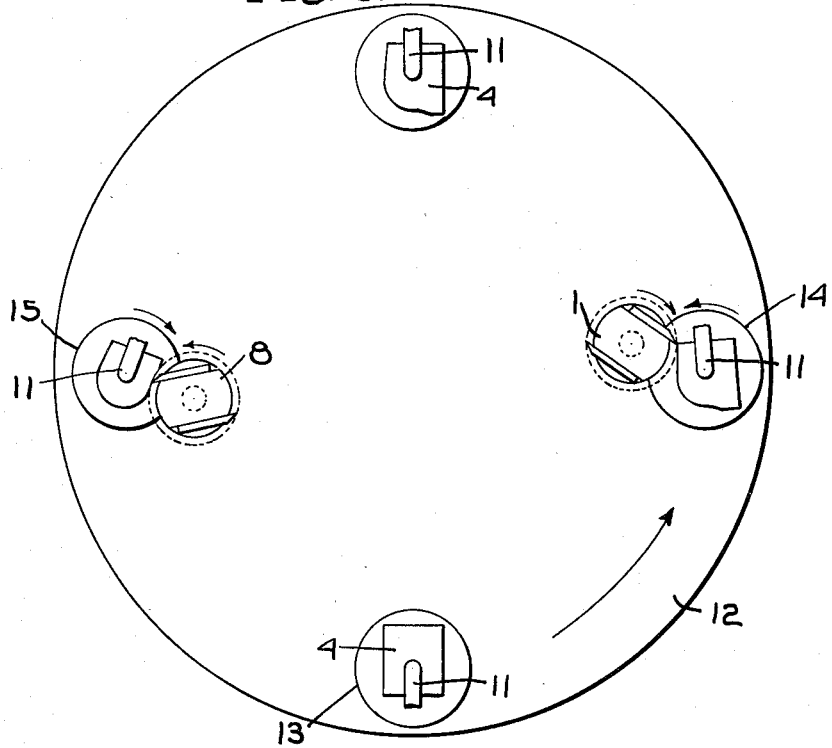
Figure 6:
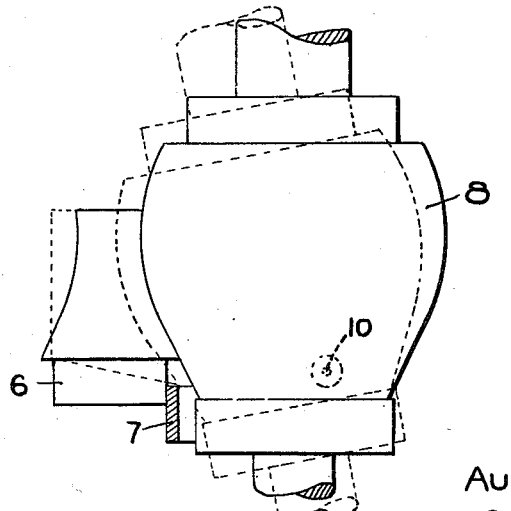

In the drawings, Fig. 1 is a perspective view of an uncut heel block. Fig. 2 is a diagrammatic illustration of the first step in the process. Fig. 3 is a diagrammatic illustration of the second major operation in the process. Fig. 4 is a perspective view of a heel block processed by the method of the invention. Fig. 5 is a plan view of the work table and Fig. 6 is a vertical view of the cutter.

The cutters employed in practicing the invention are or may be of the usual form employed in shaping wood heels. Such a cutter is shown as 1 in the drawings and is provided with a contoured cutting edge 2 shaped to the desired profile of the sides of the heel.

In carrying out the steps of the process, the cutter 1 is driven at high speed in a direction, for example, indicated by the arrow, with its cutting edges traversing the peripheral path indicated by the dotted line 3. The rough block 4 is fed into engagement with the cutter to execute the first step in the cutting operation. This first cut is initiated at the back face 5 of the block. During the cutting operation, the block 4 is rotated about an axis extending heightwise of the block and in a direction opposite to that of the cutter until the cutter reaches the breast edge 5' of the block, where the cut terminates. The block now has the appearance of that shown in Fig. 2 wherein one side and substantially one-half of its back face is completed.

During the cutting operation, a form or template 6 is held in fixed relation to the block. Throughout the duration of the cut, the form 6 engages an abutment 7 having a fixed position with respect to the axis of the cutter 1 in a manner well known in the art. This abutment may be in the form of a rigid pin or shoulder or a concentric shoulder or roll on the cutter shaft. The purpose of the form is to shape the top and bottom surfaces of the heel in accordance with a predetermined design incorporated in the form.

The next step in the process is to present the back face of the block now partially shaped to another cutter 8 having the same contour as the cutter 1, but driven in the opposite direction. The block is then again rotated about its heightwise axis in a direction opposite to that of the cutter 8 while in engagement with the cutter and under the control of the form 6. This second cut is continued to the breast edge 9, thus completing the process.

It is usual practice to cut heel blocks from heel stock in which the grain of the wood runs substantially straight from front to back of the block. It is assumed that the heel block processed by the present invention will be so prepared. By following this standard practice, a smooth and accurate surface upon the heel is assured.

An additional feature may be incorporated into the process which enables the operator to shape a wide variety in styles of heels. This feature consists in the tilting of the cutter axis about a calculated pivot point during the cutting operation. Such a pivot point is shown at 10 in Fig. 6 and in any case should be chosen to be closely adjacent to or within the periphery of the cutting edges of the cutter. This tilting of the cutting axis presents different points along the cutting edges of the cutter to the heel block. By properly calculating the position of the pivot 10, a correctly shaped heel may be formed with no additional relative axial motion between the cutter and the block.

A possible automatic arrangement of the necessary elements for carrying out the process is shown diagrammatically in Fig. 5. A plurality of jacks 11 are rotatably mounted in and equally spaced about the periphery of a table or turret 12. The table 12 is rotated intermittently and stops at intervals determined by the number of jacks. In the structure shown there are four jacks, the table stopping every quarter of a revolution. Each time the table comes to rest at a loading station 13, a block is clamped in the jack 11. At another station located at 14, the cutter 1 performs the first cut upon the block 4 in the manner described in connection with Fig. 2. When the partially turned block arrives at the final station 15, the cutter 8 performs the second cut upon the block 4 in the manner described in connection with Fig. 3.

While specific means have been shown and described in carrying out the process of the invention, any suitable means may be employed which will effect the desired end in the specified sequence of operation.

Having thus described the invention, what I claim is:

1. A method of shaping the contoured side and back faces of a rough block comprising initiating a plurality of forming cuts at the back face of a heel block, and ending the cuts at the breast face of the block, and executing each cut by rotating the block about a heightwise axis while in cutting relation to a rotating cutter, such rotation of the block being in a direction opposite to that of the cutter for the length of each forming cut from said back face of the block to the breast face.

2. A method of turning the contoured side and back faces of a wood heel comprising initiating forming operations at the back face of a rough heel block, the grain of which extends substantially straight from back to front thereof, terminating the forming operations at the breast face of the block, and executing each forming operation by rotating said block about a heightwise axis while in cutting engagement with a rotating cutter and in a direction opposite to that of the cutter for the length of each cut from said back face of the block to the breast face.

3. A method of shaping the back and side faces of a wood heel, comprising feeding the back face of a rough block into cutting relation with a rotating cutter, effecting a cut by rotating a block about a heightwise axis in a direction opposite to that of the cutter, ending the cut at the breast edge, presenting the back face of the partially turned block to another cutter rotating in a direction opposite to that of the first cutter and effecting the second cut by rotating the block about its heightwise axis in a direction opposite to that of the second cutter and ending the cut at the breast face.

4. A method of shaping the back and side faces of a rough wood heel block, having its grain running susbtantially straight from back to front, comprising initiating a cut at the back face of the block, rotating the block during the cut in a direction opposite to that of the cutter and ending the cut at the breast edge, again presenting the back face of the block to a second cutter rotating in the opposite direction to that of the first cutter and rotating the block in a direction opposite to that of the second cutter and ending the second cut at the breast face of the block.

5. A process of turning wood heels comprising causing inter-engagement between a rough heel block and a rotating cutter, rotating the block about an axis extending heightwise of the heel, thereby to effect the cut, and tilting the cutter shaft during the cut about an axis passing through or adjacent to the peripherial limits of the cutter blades, thereby to produce the necessary components of relative motion between the cutter blades and the block to produce a predetermined varying vertical profile along the back and side faces of the heel.

6. A process of turning wood heels comprising feeding a rough heel block into cutting relation with a rotating cutter having contoured blades, rotating the block in a direction opposite to that of the cutter about an axis extending heightwise of the heel, thereby to produce the cut, and tilting the cutter spindle during the cut about an axis whose position is calculated to produce all of the necessary components of relative motion between the cutter blades and the block to produce a predetermined varying vertical profile along the back and side faces of the heel.

7. A process of turning wood heels comprising causing inter-engagement between a rough heel block and a rotating cutter, rotating the block in a direction opposite to that of the cutter about an axis extending heightwise of the heel, thereby to effect the cut, such axis remaining fixed during the cut, and tilting the cutter shaft during the cut about an axis passing through or adjacent to the peripherial limit of the cutter blades thereby to produce the necessary components of relative motion between the cutter blades and the block to produce a predetermined variable contour at the side and back faces of the heel.

8. A method of shaping the back and side faces of a wood heel in two cutting motions comprising initiating each cut at the back face of the block, and tilting the cutter spindle during each cut about an axis passing through or adjacent to the peripherial limit of the blades of said cutter.

9. A method of shaping the contoured back and side faces of a wood heel comprising inter-engagement of a rough heel block and a rotating cutter having contoured knives, initiating each cut at the back face of said block, continuing the cut along the sides of the block and ending the cut at the breast face thereof, and tilting the cutter about an axis, the position of which, relative to the cutter causes the cutter to engage the block at a predetermined sequence of positions along the knives thereof, said tilting motion establishing the correct relative angular position of the vertical axis of the block during the cutting operation, thereby to produce a predetermined variable contour at the side and back faces of the heel.

10. A method of shaping the contoured side and back faces of a rough heel block, which comprises initiating a plurality of forming strokes at the back face of the block and finishing each stroke at the breast edge thereof, and executing each stroke by rotating the block while in cutting relation to a rotating cutter, the relative direction of rotation between the block and the cutter being such that the cutter blades remove each chip by first engaging the outer uncut surface of the block and then ending each chip removing cut at the finished surface of the heel.

11. A method of turning the contoured side and back faces of a wood heel, which comprises initiating a forming operation at the back face of a rough heel block and executing the forming operation by rotating the block about a heightwise axis while in cutting engagement with a rotating cutter, the relative direction of rotation between the block and the cutter being such that each chip-removing path of the cutting edges of the cutter starts at the outer, rough surface of the block and ends at the finished surface of the heel.

12. A method of turning the contoured side and back faces of a wood heel, which comprises initiating a forming operation at the back face of a rough heel block, the grain of which extends substantially straight from back to front thereof, and executing the forming operation by rotating said block about a height-wise axis while in cutting engagement with a rotating cutter having a plurality of cutter blades, the relative direction of rotation between the block and the cutter being such that each chip-removing path of the cutting edges of the cutter blades starts at the outer rough surface of the block and ends at the finished surface of the heel.

13. A method of shaping the back and side faces of a wood heel, which comprises feeding the back face of a rough block into cutting relation with a rotating cutter, effecting an initial heel shaping cut by rotating the block about a height-wise axis in such direction that each chip-removing path of the cutting edges of the cutter starts at the outer rough surface of the block and proceeds inward, ending this initial cut at the breast edge, presenting the back face of the partially turned block to another cutter rotating in a direction opposite to that of the first cutter, effecting the second cut by rotating the block in such direction with respect to the direction of rotation of the second cutter that the chips are removed in the same manner as they are removed by the first cut, and ending the second cut at the breast face.

AUGUSTUS M. SOSA.